(12) United States Patent
Wiles

(10) Patent No.: US 9,120,250 B2
(45) Date of Patent: Sep. 1, 2015

(54) STRUCTURE COMPRISING AN ANNULAR HOUSING MADE OF COMPOSITE MATERIAL

(75) Inventor: Gary Wiles, East Cowes (GB)

(73) Assignee: GKN Aerospace Services Limited, East Cowes, Hampshire (GB)

( * ) Notice: Subject to any disclaimer, the term of this patent is extended or adjusted under 35 U.S.C. 154(b) by 46 days.

(21) Appl. No.: 13/878,514

(22) PCT Filed: Oct. 6, 2011

(86) PCT No.: PCT/GB2011/051922
§ 371 (c)(1),
(2), (4) Date: Apr. 9, 2013

(87) PCT Pub. No.: WO2012/049478
PCT Pub. Date: Apr. 19, 2012

(65) Prior Publication Data
US 2013/0192749 A1    Aug. 1, 2013

(30) Foreign Application Priority Data

Oct. 11, 2010    (GB) .................................. 1017120.5

(51) Int. Cl.
*B29C 70/56*     (2006.01)
*B29C 44/00*     (2006.01)
(Continued)

(52) U.S. Cl.
CPC ............. *B29C 44/00* (2013.01); *B29C 37/0082* (2013.01); *B29C 70/446* (2013.01); *B29C 70/543* (2013.01); *B29C 70/766* (2013.01); *B29C 70/86* (2013.01); *F01D 21/045* (2013.01); *F01D 25/24* (2013.01); *F02K 3/06* (2013.01); *F05D 2300/603* (2013.01); *Y02T 50/672* (2013.01)

(58) Field of Classification Search
CPC ............ B29C 37/0082; B29C 37/0078; B29C 70/446; B29C 70/543; B29C 70/766; B29C 70/86
USPC .......................... 156/165; 264/313, 316, 517
See application file for complete search history.

(56) References Cited

U.S. PATENT DOCUMENTS 3,896,206 A * 7/1975 Beaver et al. ................. 264/258
4,238,540 A * 12/1980 Yates et al. .................. 428/35.9
(Continued)

FOREIGN PATENT DOCUMENTS

EP    0 365 391 A1    4/1990
EP    0415207 A2     3/1991
(Continued)

OTHER PUBLICATIONS

International Search Report and Written Opinion dated Mar. 16, 2012 for International Application No. PCT/GB2011/051922.
(Continued)

*Primary Examiner* — William Bell
(74) *Attorney, Agent, or Firm* — Bejin Bieneman PLC

(57) ABSTRACT

A structure such as a containment case (2) for a gas turbine engine (1) comprises an annular housing (3) made of composite material. A sleeve-like flange unit (4) is fitted onto an end of the housing (3) and is mechanically joined thereto by a first portion (31, 32, 33) of the composite material of the housing which projects into a recess (411) of the flange unit (4). This reduces or eliminates the need to use mechanical fasteners to connect the housing (3) to the flange unit (4).

14 Claims, 6 Drawing Sheets

(51) Int. Cl.
| | |
|---|---|
| *B29C 37/00* | (2006.01) |
| *B29C 70/44* | (2006.01) |
| *B29C 70/54* | (2006.01) |
| *B29C 70/76* | (2006.01) |
| *F01D 21/04* | (2006.01) |
| *F02K 3/06* | (2006.01) |
| *B29C 70/86* | (2006.01) |
| *F01D 25/24* | (2006.01) |

(56) References Cited

U.S. PATENT DOCUMENTS

| | | | |
|---|---|---|---|
| 4,706,364 A * | 11/1987 | Aubry | 29/458 |
| 5,082,314 A | 1/1992 | Aubry et al. | |
| 5,160,671 A | 11/1992 | Satoh | |
| 5,204,042 A | 4/1993 | James et al. | |
| 5,928,451 A | 7/1999 | Johansson et al. | |
| 6,863,763 B2 * | 3/2005 | Lee et al. | 156/188 |
| 7,731,593 B2 * | 6/2010 | Dewhirst et al. | 464/181 |
| 2002/0108248 A1 * | 8/2002 | Meggiolan | 29/894.36 |
| 2008/0115339 A1 | 5/2008 | Blanton et al. | |
| 2012/0043014 A1 | 2/2012 | Lim et al. | |

FOREIGN PATENT DOCUMENTS

| | | |
|---|---|---|
| EP | 1231047 A1 | 8/2002 |
| GB | 2 051 303 A | 1/1981 |
| WO | 2005/105417 A1 | 11/2005 |

OTHER PUBLICATIONS

Response to Written Opinion for PCT/GB2011/051922 dated Jul. 31, 2012.

Written Opinion of IPRP for PCT/GB2011/051922 dated Dec. 5, 2012.

Further Response to Written Opinion for PCT/GB2011/051922 dated Jan. 3, 2013.

IPRP for PCT/GB2011/051922 dated Jan. 23, 2013.

Search Report dated Nov. 22, 2010 in connection with GB1017120.5.

UK Patent Office, Search and Examination Report, Application No. GB1017120.5, Apr. 5, 2013.

EPO Examination Report for Application No. 11770499.9-1703 dated Jul. 30, 2014 (4 pages).

* cited by examiner

STRUCTURE COMPRISING AN ANNULAR HOUSING MADE OF COMPOSITE MATERIAL

CROSS-REFERENCE TO RELATED APPLICATIONS

This application represents the national stage entry of PCT International Application No. PCT/GB2011/051922 filed Oct. 06, 2011 and claims the benefit of Great Britain Application No. 1017120.5 filed Oct. 11, 2010. The contents of both of these applications are hereby incorporated by reference as if set forth in their entirety herein.

FIELD OF THE INVENTION

The present invention relates to a structure such as a containment case for a gas turbine engine.

BACKGROUND

Characteristics of composite materials have meant that composite components are employed in an increasing range of applications from aerospace to automotive parts.

In the aerospace industry, for example, composite materials have been used for a number of years owing to their strength to weight ratio. The term "composite materials" (known also as "composites") is used to describe materials comprising for example glass fibre or carbon fibres and an epoxy resin (or similar). These are also known as glass reinforced plastic or carbon fibre reinforced composites. The carbon fibre reinforced composite material offers improved properties such as lower weight, improved fatigue/damage resistance, corrosion resistance and negligible thermal expansion.

The use of these materials has increased throughout the aerospace industry predominantly because of the fuel savings which can be achieved over the life of an aircraft by reducing the overall sum weight of the components making up the aircraft. Aerodynamic as well as structural components are formed of composite materials and particularly carbon fibre materials.

A composite component is laid-up using a cloth, tape or the like pre-impregnated with resin to form a stack corresponding to the desired shape of the part to be formed. The stack is then cured either at ambient temperature and pressure or at elevated temperature and pressure in an autoclave to create a hardened component.

A gas turbine engine such as a turbofan may be provided with a containment case for preventing a broken blade of the engine from exiting the engine and damaging the rest of the aircraft. For example, a containment case may be provided around the fan at the front of the turbofan engine. The containment case may be made of composite material such as carbon fibre reinforced composite material and/or Kevlar reinforced composite material. The containment case is in the shape of a generally cylindrical barrel or housing. The containment case needs to be attached to adjacent structural components of the engine and it is therefore desirable for the containment case to include a flange at one or both of the ends of the barrel or housing.

The plies or layers of the composite barrel may be machine laid on a mould by using an automatic fibre placement (AFP) machine. Because of the complex shape of the flange, it has proved difficult to manufacture the flange out of composite material (e.g. by using an AFP machine) and to integrate the flange with the barrel. If the flange is separately manufactured and then attached to the barrel after the composite material of the barrel has been cured, it has been necessary to bolt or bond the flange to the barrel.

There is a general need for an improved technique for joining a sleeve to a composite housing of a structure.

SUMMARY OF THE INVENTION

According to a first aspect of the present invention, there is provided a method of assembling a structure, comprising the steps of:
forming an annular housing comprising composite material;
fitting a sleeve onto the housing; and
curing the housing;
wherein, before or during the curing step, a first portion of the composite material of the housing is forced into a recess of the sleeve to fasten the sleeve to the housing.

The mechanical joint between the first portion of the composite material of the housing and the recess of the sleeve reduces or eliminates the need to use mechanical fasteners such as bolts to join the housing to the sleeve.

In our preferred embodiment, the sleeve comprises an annular base and a flange projecting radially outwardly from the base; and the fitting step comprises sliding the base of the sleeve onto the housing. The flange may be annular. Alternatively, a plurality of part-annular flanges could be provided at positions which are circumferentially spaced apart around the annular base.

Usually, the flange will be provided with hole(s) so that, if the structure is a containment case, the containment case can be attached to an adjacent structure of the engine.

In our preferred embodiment, the base is tubular and the flange is positioned at an end of the base. For example, during the fitting step, the base of the sleeve slides onto the housing so as to position the flange at an end of the structure.

The base of the sleeve may be cylindrical or it may be (e.g. slightly) tapered in the direction of the longitudinal axis of the structure, such as if, for example, the annular housing is also tapered to facilitate removal from a mould on which the housing is formed.

In our preferred embodiment, the base and the flange of the sleeve are generally L-shaped in cross section.

The sleeve may be made of metal, e.g. as a metal casting or forging. Alternatively, the sleeve may be made of composite material which may be the same as or different to the composite material of the annular housing. The curing step that is used to cure the composite material of the annular housing may also be used to cure the composite material of the sleeve. Alternatively, the sleeve may have been (e.g. partially) cured before being fitted onto the annular housing.

Thus, the sleeve may be independently manufactured from composite to enable the sleeve to have a complex shape.

In our preferred embodiment, the forming step comprises laying-up the composite material on an outer peripheral surface of a mould including positioning the first portion of the composite material over a movable portion of the mould; and the first portion of the composite material of the housing is forced into the recess of the sleeve by radially outwardly moving the movable portion of the mould.

The outer peripheral surface of the mould may be generally cylindrical or may be tapered to facilitate sliding the cured annular housing off the mould. The outer peripheral surface of the mould may be, for example, generally drum-shaped.

In our preferred embodiment, the movable portion of the mould is annular. For example, the annular movable portion may be positioned between first and second annular static portions of the mould.

In our preferred embodiment, the movable portion of the mould has a retracted position in which it forms a recess; in the forming step, the first portion of the composite material is laid-up into the recess of the mould; and when the movable portion is radially outwardly moved from its retracted position to an advanced position the first portion of the composite material is advanced into the recess of the sleeve.

Preferably, when the movable portion of the mould is in its advanced position, the inner peripheral surface of the first portion of the composite material is substantially flush with the adjacent inner peripheral surface of the composite material. This facilitates easy removal (sliding off) of the cured housing from the mould.

In our preferred embodiment, the forming step comprises:
laying-up inner plies of the composite material above a static portion and the movable portion of the mould;
laying-up an intermediate band of the composite material above the movable portion of the mould; and
laying-up outer plies of the composite material above the static portion and the movable portion of the mould.

Thus, the first portion of the composite material is formed by the intermediate band and the parts of the inner plies beneath the intermediate band and the parts of the outer plies above the intermediate band.

When the movable portion of the mould is in its retracted position, it is preferable that the outer peripheral surface of the first portion of the composite material is substantially flush with the adjacent outer peripheral surface of the composite material. This facilitates sliding the sleeve onto the housing before the movable portion of the mould is moved from its retracted position to its advanced position.

In our preferred embodiment, the mould comprises a main body containing an expandable unit arranged to function as the movable portion; and the first portion of the composite material of the housing is forced into the recess of the sleeve by expansion of the expandable unit.

The expandable unit could be, for example, an inflatable bladder. However, in our preferred embodiment, the expandable unit comprises a material (e.g. silicone rubber) that has a coefficient of expansion greater than that of the material (e.g. metal) of the main body of the mould.

When the expandable unit is of a type responsive to heat in order to expand, it may rely on being heated during the curing step, e.g. being heated by an oven or autoclave used to perform the curing. The thermally-expandable material could be provided as separate blocks corresponding in position to respective separate first portions of the composite material of the housing which are circumferentially spaced-apart. Where the first portion of the composite material of the housing is annular, the thermally-expandable material may be provided, for example, as an annular ring which is fitted into an annular recess of the main body of the mould.

The main body of the mould may contain a heater adjacent the thermally-expandable material as a substitute for or supplement to the heating of the thermally-expandable material which occurs during the curing step. For example, the heater could be activated prior to the curing step.

According to a second aspect of the present invention, there is provided a structure comprising:
an annular housing comprising composite material; and
a sleeve which is fitted onto the housing;
wherein a first portion of the composite material of the housing projects into a recess of the sleeve and mechanically locks the sleeve onto the housing.

In our preferred embodiment, the first portion of the composite material of the housing is annular and the recess of the sleeve is annular, and this provides uninterrupted mechanical joining of the housing to the sleeve around the full circumference of the structure, such as a containment case.

Alternatively, at each of a plurality of circumferentially spaced-apart positions around the structure, there could be provided a respective first portion of the composite material of the housing and a respective recess of the sleeve. Thus, the sleeve and the housing would be mechanically locked together at a plurality of separate positions (e.g. at least three positions) around the circumference of the structure.

In our preferred embodiment, the sleeve comprises an annular base and a flange projecting radially outwardly from the base.

Preferably, the base is tubular and the flange is positioned at an end of the base.

The sleeve may be made of metal or composite material.

In our preferred embodiment, the first portion of the composite material of the housing is an annular bead and the recess of the sleeve is an annular recess. The annular bead of the composite material of the housing may have the same thickness as the adjacent composite material of the housing, and thus it is indented on its inner peripheral surface. Alternatively, the annular bead may be thicker than the adjacent composite material of the housing. Thus, the inner peripheral surface of the annular bead may be made substantially flush with the inner peripheral surface of the adjacent composite material.

According to a third aspect of the present invention, there is provided a mould for forming an annular housing, comprising a main body providing an annular static mould surface and containing an expandable unit providing an annular movable mould surface which is radially outwardly movable.

In our preferred embodiment, the expandable unit comprises a material having a coefficient of expansion greater than that of the main body of the mould.

Preferably, the mould further comprises a jig which is detachably connected to the main body adjacent the expandable unit for holding in position a sleeve which is located above the movable mould surface.

BRIEF DESCRIPTION OF THE DRAWINGS

Embodiments of the present invention will now be described, by way of example only, with reference to the accompanying drawings in which.

Figure 1:
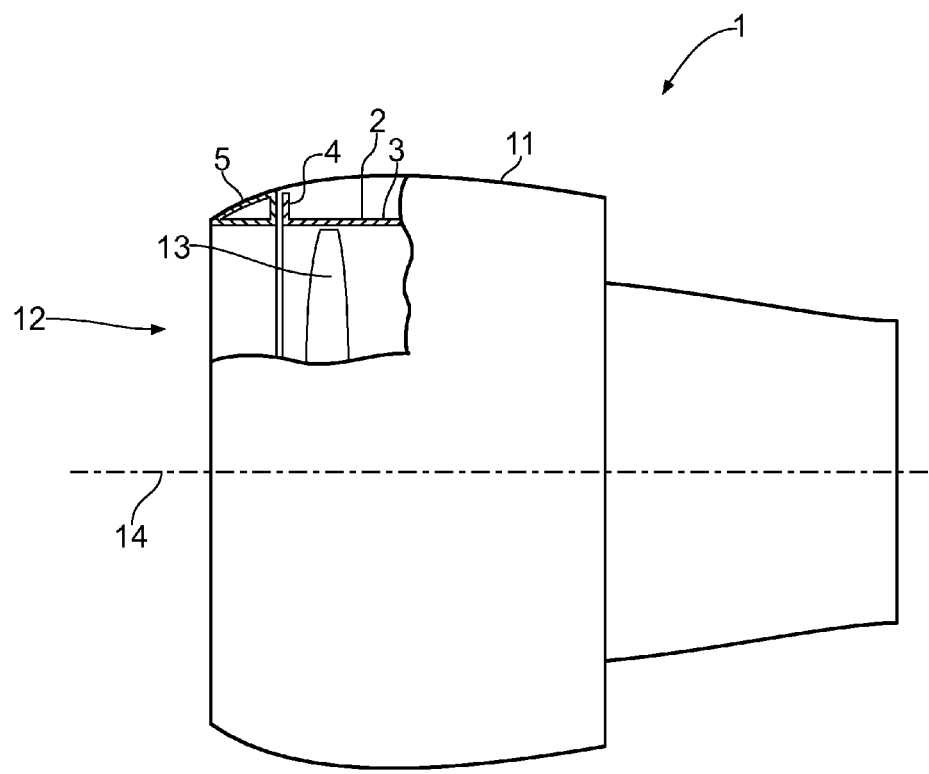
FIG. 1 is a diagrammatic side view of a turbofan engine, partly cut away to show a containment case and a fan blade.

While the invention is susceptible to various modifications and alternative forms, specific embodiments are shown by way of example in the drawings and are herein described in detail. It should be understood, however, that the drawings and detailed description of the specific embodiments are not intended to limit the invention to the particular forms disclosed. On the contrary, the invention is cover all modifications, equivalents and alternatives falling within the spirit and the scope of the present invention as defined by the appended claims.

Description Of Embodiments

FIG. 1 shows a turbofan engine 1 having a fan case 11 defining a fan duct 12 which contains a rotating disc of fan blades 13.

The fan blades 13 rotate around a central longitudinal axis 14 of the engine 1.

The fan case 11 is annular and is centred on the longitudinal axis 14. The fan case 11 is shown partly cut away in FIG. 1 in order to diagrammatically illustrate the fact that the fan case 11 includes an annular containment case 2 positioned around the periphery of the disc of fan blades 13 in order to contain any broken fan blade 13. The containment case 2 comprises a generally-cylindrical barrel or housing 3 at the front end of which is an outwardly-extending annular flange unit 4.

The containment case 2 is centred on the longitudinal axis 14 of the engine 1 and is held in position by being fastened to other components of the fan case 11 such as an annular front leading edge 5. The flange unit 4 may be provided with holes for fasteners which are used to attach the containment case 2 to the structure of the leading edge 5.

Figure 2:
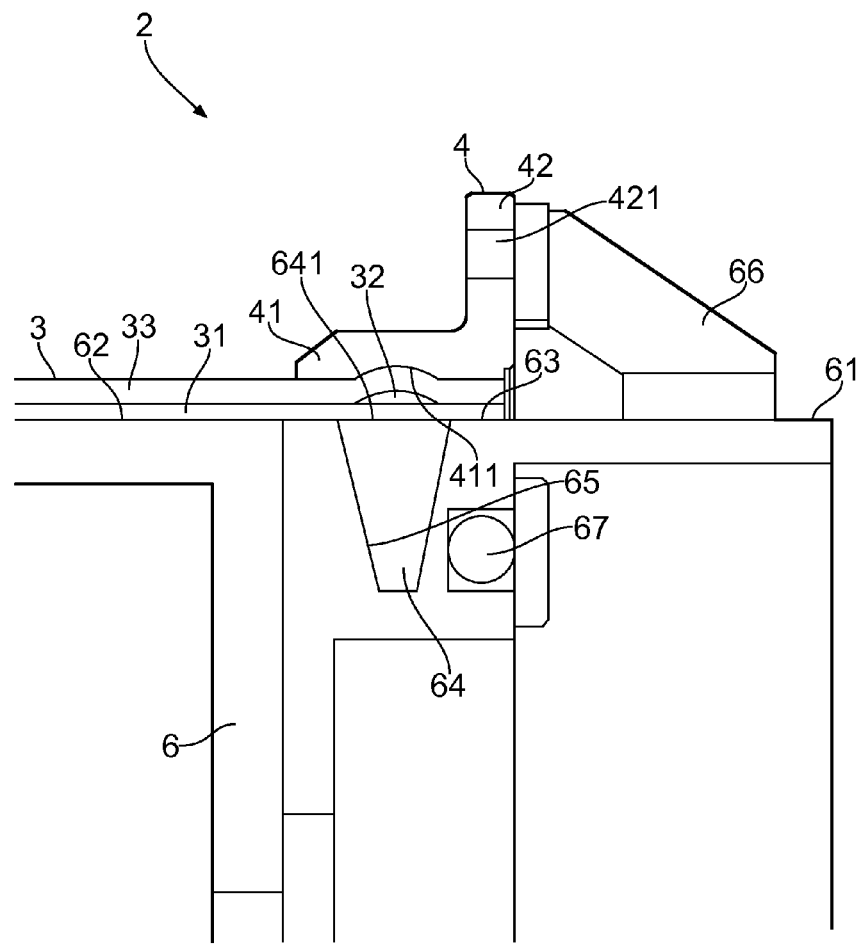
FIG. 2 is a cross-sectional view of part of a containment case in accordance with the present invention on part of a mould used during the process of manufacturing the containment case.
Figure 3:
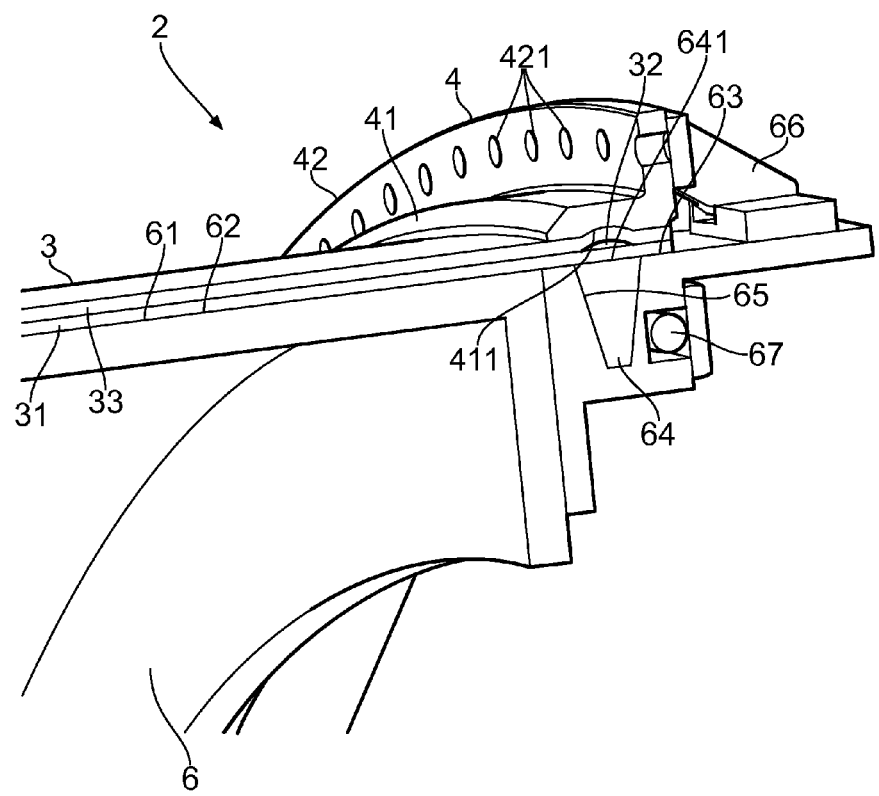
FIG. 3 is similar to FIG. 2 but viewed from a perspective angle in order to show more clearly the structure lying behind the plane of the cross-section of FIG. 2.

FIGS. 2 and 3 show one end of the containment case 2 after it has been manufactured on a mould 6.

As is more clearly visible in FIGS. 2 and 3, compared with FIG. 1, the containment case 2 is assembled together from separate components in the form of the housing 3 and the flange unit 4. The stages of the assembly process are shown in FIGS. 4 to 9.

The housing 3 has a flange unit 4 at its front end and at its rear end. For reasons of clarity, only one of the flange units 4 is shown in the Figures.

The housing 3 is annular and is generally-cylindrical in shape with a circular cross-section. The housing 3 is made of composite material such as carbon fibre reinforced composite material and/or Kevlar reinforced composite material. The housing 3 is made with pre-impregnated composite material containing any suitable resin (e.g. epoxy resin) as is well known.

Figure 4:
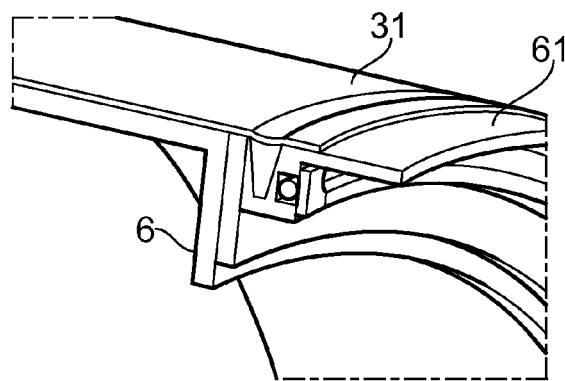
FIGS. 4 to 9 show the stages of a method of assembling a containment case in accordance with the present invention.

FIG. 4 shows the first stage of the manufacturing or assembly process. The mould 6 is shaped generally like a drum and has a generally-cylindrical outer peripheral surface 61 which is a mould surface on which is laid-up the composite material of the housing 3. Because the housing 3 has a simple shape (basically cylindrical) and because there is easy access to the outer peripheral surface 61, it is possible to automate the manufacture of the housing 3 in terms of laying-up the composite material which makes up the structure of the housing 3. For example, an automatic fibre placement (AFP) machine may be used. The surface 61 comprises a central or main annular static mould surface 62 and, at each end of the mould 6, a secondary annular static mould surface 63. Between the central mould surface 62 and each secondary or end mould surface 63, there is located an expandable unit 64 which is annular and is located in an annular V-shaped recess 65 of the mould 6. The annular outer peripheral surface of the expandable unit 64 provides a movable mould surface 641.

In the first stage (FIG. 4) of the assembly or manufacturing process, inner plies 31 are machine laid-up on the central mould surface 62, the movable mould surface 641 and the secondary mould surface 63. At this stage, the expandable unit 64 is un-expanded and thus the movable mould surface 641 is in the form of an annular recess relative to the static mould surfaces 62, 63. Thus, the inner plies 31 of the composite material of the housing 3 dip down into the recessed mould surface 641 (see FIG. 4).

Figure 5:
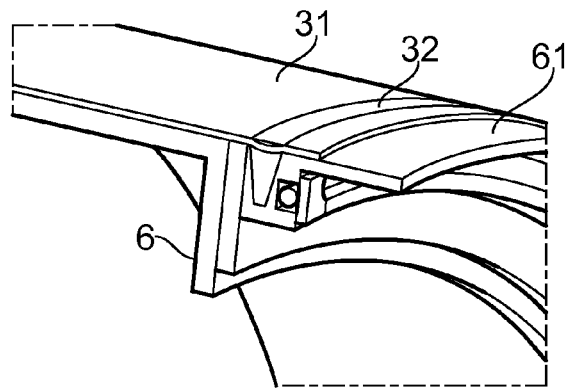
Figure 6:
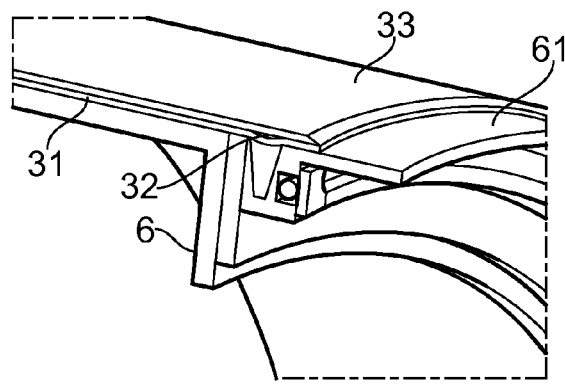

In the second stage (FIG. 5), an annular band 32 of the composite material of the housing 3 is laid-up circumferentially around the mould 6 so as to be positioned on the inner plies 31 above the movable mould surface 641, but not above the static mould surfaces 62, 63 (see FIG. 5). The annular outer peripheral surface of the band 32 is substantially flush or level with the outer peripheral surfaces of the adjacent parts of the inner plies 31.

In the next stage (FIG. 6), outer plies 33 are machine laid-up on the inner plies 31 and the band 32. The composite material of the outer plies 33 is substantially co-terminus with the inner plies 31 (see FIG. 6).

The outer peripheral surface of the outer plies 33 is undistorted at this stage and is thus generally cylindrical. This facilitates the next stage of the process (FIG. 7) in which the flange unit 4 is slid onto the end of the housing 3. The inner diameter of the flange unit 4 is substantially the same as the outer diameter of the housing 3, so that the housing 3 nests inside the flange unit 4 (see FIG. 7).

The flange unit 4 may be made of metal or composite material (e.g. the same composite material as that of the housing 3).

The flange unit 4 is generally L-shaped in cross-section and has a base or foot 41 and a flange 42 which extends radially outwardly of the base 41.

The base 41 is tubular so that the flange unit 4 can function as a sleeve which may be slid onto the housing 3. The inner peripheral surface of the base 41 has an annular recess 411 which functions as a cavity for receiving an annular bead of the composite material of the housing 3 which is produced by operation of the expandable unit 64. The annular flange 42 is positioned at an end of the base 41 and includes circumferentially spaced-apart holes 421 through which may be passed fasteners for attaching the containment case 2 to an adjacent structural component of the fan case 11 such as the front leading edge 5.

Figure 7:
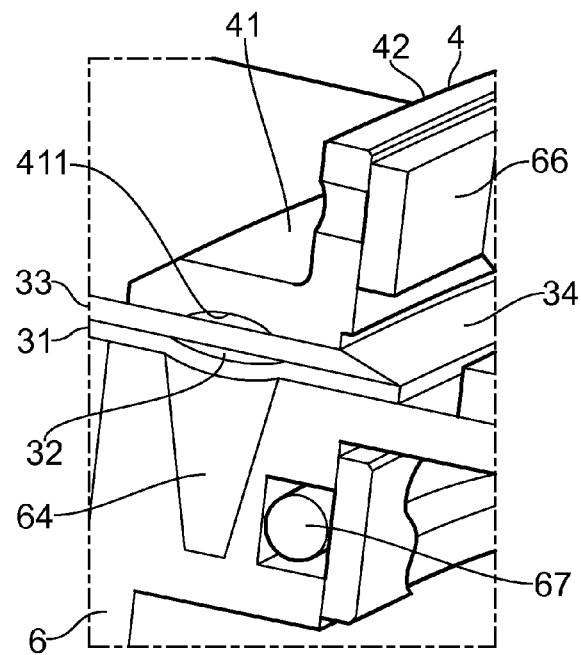

As may be seen from FIG. 7, the flange unit 4 is slid onto the housing 3 in a sleeve-like manner until the recess 411 in the base 41 is positioned above the expandable unit 64. A jig 66 is then fitted to the part of the mould 6 adjacent the secondary mould surface 63 so that the jig 66 can hold the flange unit 4 in the correct position (see FIG. 7). Before or after the jig 66 is fitted, a rough circumferential edge 34 of the housing 3 may be trimmed off (see FIGS. 7 and 8).

Figure 8:
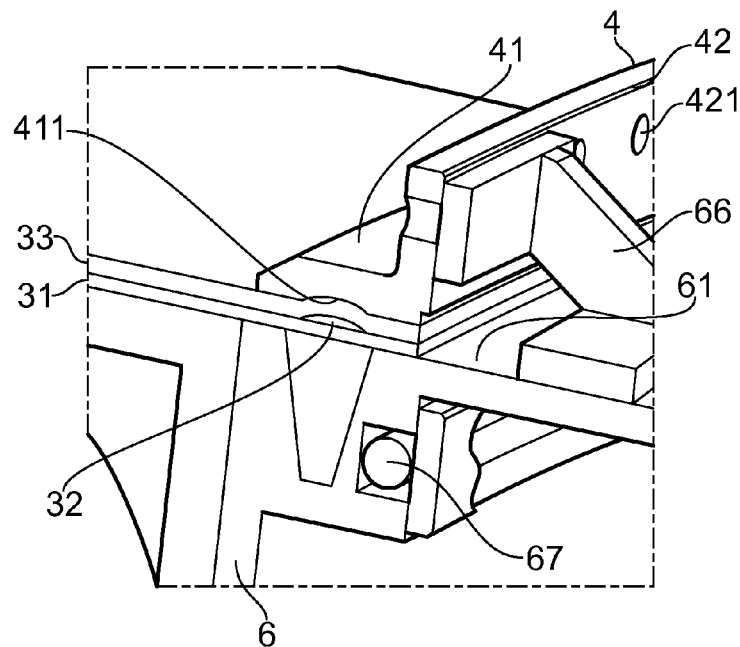

The expandable unit 64 is made of a thermally-expandable material (e.g. silicone rubber) which is heated by a circumferential heating element 67 in order to cause the material of the expandable unit 64 to expand and thereby change the movable mould surface 641 from having a recessed or concave shape in cross-section to having a generally flat or level shape in cross-section (see the transition from FIG. 7 to FIG. 8). In some circumstances, it may be desirable to arrange for the expansion of the material of the expandable unit 64 to advance the movable mould surface 641 to having a convex or projecting shape in cross-section.

When the movable mould surface 641 transitions from the recessed or retracted position (FIG. 7) to the flat or advanced position (FIG. 8), it pushes or forces the overlying composite material of the housing 3 up into the annular recess 411 of the flange unit 4.

This localised deformation of the composite material of the housing 3 mechanically joins or locks the housing 3 to the flange unit 4. In other words, the housing 3 and the flange unit 4 are interlocked together, and the flange unit 4 is no longer able to slide off the barrel of the housing 3.

It is therefore not necessary to use fasteners or adhesive to attach together the two major components (housing 3 and flange unit 4) of the containment case 2. The composite material of the housing 3 which is pushed into the recess 411 by the expandable unit 64 is pushed over the full circumference of the housing 3 so that the mechanical joint between the housing 3 and the flange unit 4 is annular.

The mould 6 carrying the housing 3 and the flange unit 4 is then positioned in an oven or autoclave in order to cure the composite material of the housing 3 (and the composite material of the flange unit 4, if the flange unit 4 is made of composite material instead of metal). The heat applied during the curing process continues to ensure that the expandable unit 64 remains expanded such that the movable surface 641 remains in its advanced position and continues to hold the annular projecting bead of composite material of the housing 3 in the recess 411.

Figure 9:
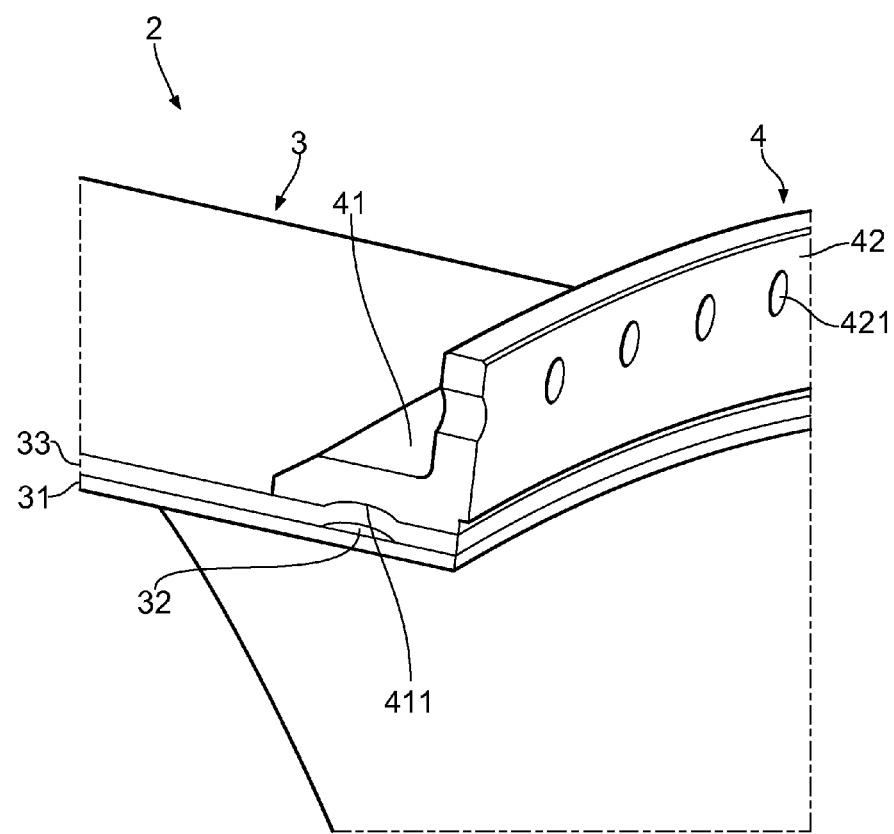

When the curing process or cycle has been completed, and the composite material of the housing 3 has been hardened, the containment case 2 (housing 3 and flange unit 4) is allowed to cool down to the ambient or starting temperature. The expandable unit 64 contracts and the movable mould surface 641 retreats from its advanced (flat) configuration to its retracted (concave) configuration. The jig 66 may then be removed, and the containment case 2 may be slid off the mould 6 in the direction of the central longitudinal axis of the mould 6. The resulting containment case 2 is shown in FIG. 9. Fasteners may now be passed through the holes 421 of the flange 42 in order to connect the containment case 2 to the front leading edge 5 of the fan case 11.

The composite material used to manufacture the housing 3 (the inner and outer plies 31, 33 and the band 32) may be pre-impregnated cloth, fabric or tape. Cloth or fabric could be used for the inner and outer plies 31, 33 and tape could be used for the band 32. Alternatively, uni-directional tape of pre-impregnated composite material could be used for the inner and outer plies 31, 33 as well as the band 32 so that the same tape-laying head of an automated machine may be used to lay-up all of the components of the housing or barrel 3.

The material of the expandable unit 64 has a coefficient of expansion which is greater than that of the surrounding metal of the main body of the mould 6. Thus, when heated, the material of the expandable unit 64 expands more than the metal of the main body of the mould and, for that reason, the outer peripheral surface (the movable mould surface 641) of the expandable unit 64 moves radially outward in order to change from a retracted (concave) configuration to an advanced (flush) configuration. In the advanced configuration, the movable mould surface 641 is substantially flush or level with the adjacent outer peripheral surface of the central static mould portion 62 and the adjacent outer peripheral surface of the secondary static mould surface 63.

If the housing 3 has been laid-up without a band 32 being positioned intermediate the inner plies 31 and the outer plies 33, the expandable unit 64 could be arranged to have a retracted configuration in which the movable mould surface 641 is flush, and an advanced configuration in which the movable mould surface 641 is convex so as to push the material of the inner and outer plies 31, 33 overlying the expandable unit 64 up into the recess 411 of the flange unit 4.

The heating element 67 may be dispensed with if the heating effect of the curing process is sufficient to expand the expandable unit 64 by the required amount. As an alternative to using thermally-expandable material for the expandable unit 64, a pneumatically expandable bladder could instead be used.

In the illustrated embodiment, the expandable unit 64 is used to produce an annular bead of the composite material of the housing 3 which projects into the recess 411 of the flange unit 4 around the full circumference of the containment case 2. This produces a good mechanical joint between the housing 3 and the flange unit 4.

In other words, the portion of the composite material of the housing 3 which is forced into the recess 411 is an annular portion comprising the composite material which overlies the expandable unit 64 (i.e. the band 32 and the part of the inner plies 31 beneath the band 32 and the part of the outer plies 33 above the band 32). It is this portion of the composite material which forms a circumferential bead projecting into the recess 411.

However, the portion of the composite material of the housing 3 which is pushed forwards does not have to be a complete annulus. The portion could be part of an annulus, and the portion could be repeated at multiple circumferentially-spaced apart positions around the containment case 2. Thus, the housing 3 and the flange unit 4 would be joined or locked together at multiple separate positions around the circumference of the containment case 2.

There has been described a method of assembling embodiments of a structure 2, comprising the steps of forming an annular housing 3 comprising composite material; fitting a sleeve 4 onto the housing 3; and curing the housing 3; wherein, before or during the curing step, a first portion 31, 32, 33 of the composite material of the housing 3 is forced into a recess 411 of the sleeve 4 to fasten the sleeve 4 to the housing 3.

There have also been described embodiments of a structure 2 comprising an annular housing 3 comprising composite material; and a sleeve 4 which is fitted onto the housing 3; wherein a first portion 31, 32, 33 of the composite material of the housing 3 projects into a recess 411 of the sleeve 4 and mechanically locks the sleeve 4 onto the housing 3.

There have also been described embodiments of a mould 6 for forming an annular housing 3, comprising a main body providing an annular static mould surface 62, 63 and containing an expandable unit 64 providing an annular movable mould surface 641 which is radially outwardly movable.

The invention claimed is:

1. A method of assembling a structure, comprising the steps of:
providing a mould comprising a main body containing a thermally-expandable unit arranged to function as a movable portion, wherein the thermally-expandable unit comprises a material having a coefficient of thermal expansion greater than that of the main body of the mould;
forming an annular housing comprising composite material by laying-up the composite material on an outer peripheral surface of the main body of the mould including positioning a first portion of the composite material over the thermally-expandable unit of the mould;
fitting a sleeve onto the housing; and
curing the housing;
wherein, before or during the curing step, the first portion of the composite material of the housing is forced into a recess of the sleeve by radially-outward thermal expansion of the thermally-expandable unit of the mould so as to fasten the sleeve to the housing.

2. A method according to claim 1, wherein:
the sleeve comprises an annular base and a flange projecting radially outwardly from the base; and
the fitting step comprises sliding the base of the sleeve onto the housing.

3. A method according to claim 2, wherein the base is tubular and the flange is positioned at an end of the base.

4. A method according to claim 1, wherein the sleeve is made of metal.

5. A method according to claim 1, wherein:
the thermally-expandable unit of the mould has a retracted position in which it forms a recess;
in the forming step, the first portion of the composite material is laid-up into the recess of the mould; and
when the thermally-expandable unit is radially-outwardly thermally expanded from its retracted position to an advanced position the first portion of the composite material is advanced into the recess of the sleeve.

6. A method according to claim 5, wherein, when the thermally-expandable unit of the mould is in its advanced position, the inner peripheral surface of the first portion of the composite material is substantially flush with the adjacent inner peripheral surface of the composite material.

7. A method according to claim 1, wherein the forming step comprises:
laying-up inner plies of the composite material above a static portion of the main body of the mould and the thermally-expandable unit of the mould;
laying-up an intermediate band of the composite material above the thermally-expandable unit of the mould; and
laying-up outer plies of the composite material above the static portion of the main body of the mould and the thermally-expandable unit of the mould.

8. A method according to claim 1, wherein the structure is a containment case for a gas turbine engine.

9. A method according to claim 1, wherein the first portion of the composite material of the housing is annular and the thermally-expandable material of the thermally-expandable unit is provided as an annular ring which is fitted into an annular recess of the main body of the mould.

10. A method according to claim 1, wherein the main body of the mould contains a heater adjacent the thermally-expandable material of the thermally-expandable unit and the heater is activated prior to the curing step.

11. An assembly comprising:
an annular housing comprising composite material;
a sleeve which is fitted on the housing; and
a mould for forming the annular housing, the mould comprising a main body providing an annular static mould surface and containing a thermally-expandable unit providing an annular movable mould surface which is radially outwardly movable;
wherein the thermally-expandable unit comprises a material having a coefficient of thermal expansion greater than that of the main body of the mould;
the composite material of the annular housing is laid-up on the static mould surface and on the movable mould surface with a first portion of the composite material being positioned over the thermally-expandable unit of the mould; and
the thermally-expandable unit is operable by radially-outward thermal expansion to force the first portion of the composite material of the housing into a recess of the sleeve so as to fasten the sleeve to the housing.

12. An assembly according to claim 11, further comprising a jig which is detachably connected to the main body of the mould adjacent the thermally-expandable unit and holds in position the sleeve such that the recess is located above the movable mould surface.

13. An assembly according to claim 11, wherein the thermally-expandable material of the thermally-expandable unit is provided as an annular ring which is fitted into an annular recess of the main body of the mould.

14. An assembly according to claim 11, wherein the main body of the mould contains a heater adjacent the thermally-expandable material of the thermally-expandable unit.

* * * * *